US005520488A

United States Patent [19]

Obermeier

[11] Patent Number: 5,520,488

[45] Date of Patent: May 28, 1996

[54] TOOL BIT AND TOOL BIT CHUCK FOR MANUALLY OPERATED TOOL

[75] Inventor: Josef Obermeier, Peiting, Germany

[73] Assignee: Hilti Aktiengesellschaft, Fürstentum, Liechtenstein

[21] Appl. No.: 380,896

[22] Filed: Jan. 30, 1995

[30] Foreign Application Priority Data

Jan. 31, 1994 [DE] Germany .......................... 44 02 802.4

[51] Int. Cl.[6] ............................ B23B 51/02; B23B 31/22

[52] U.S. Cl. ............................ 408/226; 279/19; 408/240

[58] Field of Search ............................ 408/226, 239 A, 408/239 R, 240; 279/19.2, 19.3, 19.4, 19.5, 19.6, 19, 75; 175/320, 395, 415

[56] References Cited

U.S. PATENT DOCUMENTS

| | | | |
|---|---|---|---|
| 5,028,057 | 7/1991 | Wanner | 279/75 |
| 5,076,371 | 12/1991 | Obermeier et al. | 408/226 |
| 5,174,698 | 12/1992 | Obermeier | 408/226 |
| 5,397,203 | 3/1995 | Kleine et al. | 408/226 |

FOREIGN PATENT DOCUMENTS

| | | | |
|---|---|---|---|
| 2551125 | 5/1977 | Germany | 408/239 A |
| 3941646 | 6/1991 | Germany | 408/226 |

*Primary Examiner*—Daniel W. Howell
*Attorney, Agent, or Firm*—Anderson Kill Olick & Oshinsky

[57] ABSTRACT

A tool bit for insertion into a tool bit chuck in a manually operated tool, used for cutting and/or percussion drilling, has an axially extending chucking shank (2) with a free end. The chucking shank (2) has two locking grooves (6, 7) located diametrically opposite one another and closed at their ends spaced apart in the axial direction. In addition, the chucking shank has two axially extending rotary entrainment grooves (8, 9) disposed diametrically opposite one another and open at the free end. The transverse cross-sectional areas of the rotary entrainment grooves (8, 9) are different. To increase the transmittable torque, an additional axially extending groove (11) open at the free end of the chucking shank extends through and is positioned asymmetrically to one of the locking grooves (7). An end shoulder face (7*a*) for axially securing the tool bit is formed in the end region of the locking groove located laterally outwardly from the axially extending groove (11).

4 Claims, 3 Drawing Sheets

TOOL BIT AND TOOL BIT CHUCK FOR MANUALLY OPERATED TOOL

BACKGROUND OF THE INVENTION

The present invention is directed to a tool bit for insertion into a tool bit chuck in a manually operated tool used for cutting and/or percussion drilling. The tool bit has an axially extending chucking shank with two locking grooves located substantially diametrically opposite one another and having closed ends spaced apart in the axial direction. In addition, two rotary entrainment grooves open at a free end of the chucking shank are located substantially diametrically opposite one another and the rotary entrainment grooves have different cross-sectional areas and openings in the outside surface of the chucking shank of different circumferential dimensions.

As disclosed in DE-PS 25 51 125 large numbers of tool bits for manually operated tools are in wide use throughout the world and have chucking shanks with two locking grooves located diametrically opposite one another and two rotary entrainment grooves also located diametrically opposite one another. The manually operated tools have tool chucks for receiving such tool bits. The tool bit chucks have two axially extending entrainment strips diametrically opposite one another which cooperate with the rotary entrainment grooves open at the free end of the chucking shank for transmitting torque to the tool bit. The cross-sectional area of the rotary entrainment grooves located diametrically opposite one another are equal and, therefore, the cross-sections of the entrainment strips cooperating with them are also of the same size.

In addition to torque transmission means, a tool bit chuck of the manually operated tools also have means for axially securing the tool bits. Particularly high requirements are not needed for axially securing the tool bits, since it is only necessary to assure that the tool bit is retained in the tool bit chuck during operation, for instance, that it does not fall out of the chuck due to its weight or is not separated from the chuck when the manually operated tool along with the tool bit is removed from a structural component in which it is being used.

Accordingly, the tool bit chucks use radially displaceable locking elements for effecting axial securement and such locking elements seat against the axially closed ends of the locking grooves in the chucking shank. The locking elements can be shaped as balls or rollers. A single radially displaceable locking element can be used or two such locking elements can be located diametrically opposite one another.

At the present time the requirements for torque transmission are continuously increasing, particularly with the use of ever increasing working diameters of the tool bits along with the increase in the output of the manually operated tools being utilized. As a result, it has been noted that the previously known rotary entrainment grooves along with the cooperating entrainment strips are no longer sufficient for transmitting the required high torques. Early wear of the chucking shank before the normal wear of the remaining parts of the tool bit has taken place. To overcome these problems it has been proposed in DE-A-39 41 646 to employ rotary entrainment grooves of larger cross-section. As a result, this involves the enlargement and strengthening of the entrainment strip in the tool bit chuck cooperating with the entrainment groove.

The advantage gained by the above mentioned cross-sectional enlargement is enhanced in DE-A-39 41 646 by the use of a third rotary entrainment groove in addition to the rotary entrainment grooves located diametrically opposite one another where one of such grooves has a larger cross-section.

By using this last mentioned arrangement, considerable advantages are gained in transmitting larger torques. A considerable disadvantage exists, however, in that the third rotary entrainment groove takes the place of one locking groove. Accordingly, the tool bits provided with the third rotary entrainment groove can not be used in tools where the tool bit chuck has two locking elements located diametrically opposite one another. Manually operated tools having such tool bit chucks are, however, in very wide spread use.

If the third rotary entrainment groove is dimensioned so that the displacement of a second locking element of a tool bit chuck is not obstructed, the possibility exists of faulty locking of such tool bits in a tool bit chuck with only one locking element and with entrainment strips having the same cross-section. Such faulty locking occurs when the tool bit is wrongly inserted by turning through 180°, so that it is not axially secured and may drop out of the tool chuck. Manually operated tools with such chucks are also widely used world wide.

SUMMARY OF THE INVENTION

The primary object of the present invention is to provide a tool bit for transmitting large torques where the tool bit can be inserted into tool bit chucks having two locking elements and where the tool bit avoids faulty locking in tool bit chucks with only one locking element.

In accordance with the present invention, the chucking shank is divided into two axially extending halves by an axially extending plane passing through the rotary entrainment grooves so that at least one axially extending half of the chucking shank is provided with at least one axially extending groove open at the free end of the chucking shank.

The two locking grooves assure the use of the tool bits embodying the invention in tool bit chucks having two locking elements, and, in addition, prevent faulty locking in tool bit chucks with only one locking element. The axially extending groove provided in the invention assures, in cooperation with a rotary entrainment groove of larger cross-section that considerably greater torques can be transmitted.

Preferably, one of the axially extending halves of the chucking shank is provided with an axially extending groove to prevent weakening of the cross-section of the chucking shank, and, in addition, affords sufficiently large guide faces for the tool bit chuck.

With regard to the axial securement of the tool bit in the tool bit chuck, the best results are achieved when the end shoulder faces of the locking grooves, facing away from the free end of the chucking shank, are as large as possible. In one preferred arrangement, this is achieved by locating the axially extending groove adjacent to, but outwardly from a locking groove in the circumferential direction.

To make axial securement of the tool bit in the tool bit chuck possible, while maintaining a large share of guidance faces, it is proposed in another embodiment of the invention that the axially extending groove is located within the region of the one of the locking grooves while forming a shoulder face directed away from the free end of the chucking shank. The location of the axially extending groove in the region of the locking groove can be achieved in different ways.

One possibility for locating the axially extending groove in the region of the locking groove involves positioning the axially extending groove symmetrically relative to the locking groove.

To enlarge the shoulder face without interrupting the entrainment side flank of the axially extending groove and thereby maintaining the torque transmission capacity of the axially extending groove, the axially extending groove is arranged asymmetrically with respect to the locking groove. Such asymmetrical arrangement can be achieved in various ways.

One preferred embodiment of the asymmetrical arrangement is that the axially extending groove has different spacings in the circumferential direction with respect to the axes of symmetry of the rotary entrainment grooves. Furthermore, it is possible to locate the axially extending groove with identical spacings in the circumferential direction relative to the axes of symmetry of the rotary entrainment grooves. This arrangement involves an angular offset relative to the locking grooves. Locking the tool bit in tool bit chucks having one or two locking elements is possible in spite of the angular offset, since the locking elements are guided with a certain clearance or play and further do not always move completely into the locking grooves.

As has been pointed out, the tool bit embodying the present invention has the advantage of being insertable into different tool bit chucks available on the market. Thus, insertion is possible into tool bit chucks with one or two locking elements where the locking elements are shaped as balls as well as rollers. With regard to entrainment strips in the tool bit chuck, strips having the same or different cross-sections on both sides can be used. The advantages of the present invention are completely attained only if the inventive tool bits are used in tool bit chucks comprising at least one radially displaceable locking element cooperating with the axially closed ended locking grooves, two entrainment strips cooperating with the rotary entrainment grooves open at the free end of the chucking shank with the entrainment strips provided with different cross-sectional areas due to the different sizes of the rotary entrainment grooves, along with at least one axially extending strip cooperating with the axially extending grooves.

The various features of novelty which characterize the invention are pointed out with particularity in the claims annexed to and forming a part of this disclosure. For a better understanding of the invention, its operating advantages and specific objects attained by its use, reference should be had to the drawing and descriptive matter in which there is illustrated and described a preferred embodiment of the invention.

DETAILED DESCRIPTION OF THE INVENTION

Figure 1:
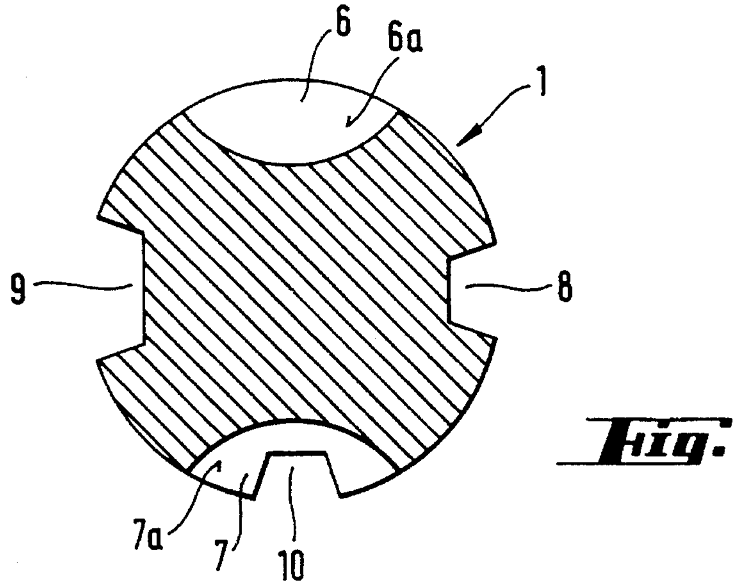
FIG. 1 is a transverse cross-sectional view of a chucking shank for a tool bit embodying the present invention.

In FIGS. 1 to 5 transverse sections of axially extending chucking shanks 1, 2, 3, 4, 5 of different tool bits embodying the present invention are shown, each having a different configuration. Each chucking shank has an outside surface extending axially and circumferentially from a free end arranged to be inserted first into the tool bit chuck. The outside surface has two locking grooves 6, 7 located diametrically opposite one another and the ends of the grooves spaced apart in the axial direction are closed. Further, the outside surface of each chucking shank 1, 2, 3, 4, 5 has two rotary entrainment grooves 8, 9 located diametrically opposite one another. One of the rotary entrainment grooves 9 has a larger cross-sectional area with a larger opening extending in the circumferential direction in the outside surface than the other rotary entrainment groove 8. While the rotary entrainment grooves 8, 9 serve for transmitting torque, the tool bit is secured in the axial direction by the locking grooves 6, 7 and these grooves have shoulder faces *6a*, *7a* directed away from the free end of the clamping shank 1, 2, 3, 4, 5 for effecting axial retention of the tool bit in the chuck.

In FIG. 1, the chucking shank 1 of the tool bit embodying the present invention has an axially extending groove 10 open at the free end of the chucking shank and disposed symmetrically to the locking groove 7. The cross-sectional area of the axially extending groove 10 is smaller than the cross-sectional area of the locking groove 7 so that a shoulder face *7a* is formed at the end of the locking groove 7.

Figure 2:
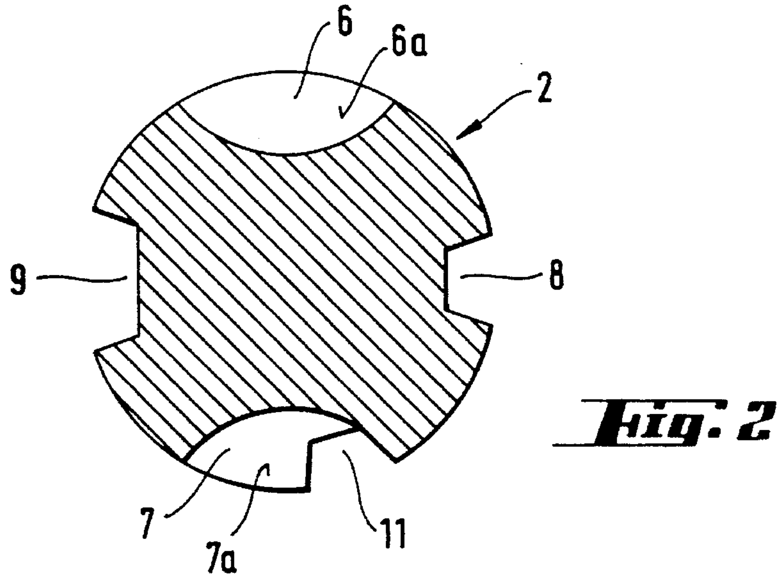
FIG. 2 is a transverse cross-sectional view of a chucking shank for another tool bit embodying the present invention.

In FIG. 2, the chucking shank 2 of another tool bit embodying the present invention is shown with a axially extending groove 11 open at the free end of the chucking shank and extending through the locking groove 7. The axially extending groove 11 is located asymmetrically relative to the locking groove 7. The axially extending groove 11 has different angular spacings or different spacings in the circumferential direction relative to the axes of the symmetry of the rotary entrainment grooves 8, 9. Since the cross-sectional area of the axially extending groove 11 is considerably smaller then the transverse cross section of the locking groove 7, a shoulder face *7a* is formed by the locking groove in the region outside the axially extending groove 11.

Figure 3:
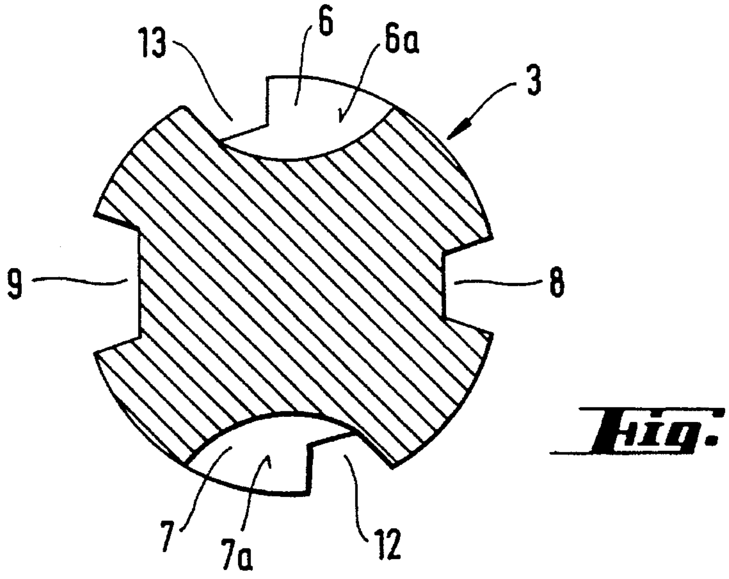
FIG. 3 is transverse cross-sectional view of a clamping shank for an additional tool bit embodying the present invention.

In FIG. 3 the chucking shank 3 of the inventive tool bit is provided with two axially extending grooves 12, 13 open at the free end of the chucking shank and each located in a different one of the locking grooves 6, 7. The axially extending grooves 12, 13 are located asymmetrically relative to the locking grooves 6, 7 and have different angular spacings or spacings in the circumferential direction from the axes of symmetry of the rotary entrainment grooves 8, 9. Since the axially extending grooves 12, 13 have a smaller cross-sectional area than the locking grooves 6, 7, shoulder faces *6a*, *7a* are formed in the ends of the locking groove laterally outwardly from the axially extending grooves 12, 13. The axially extending grooves 12, 13 are disposed diametrically opposite one another.

Figure 4:
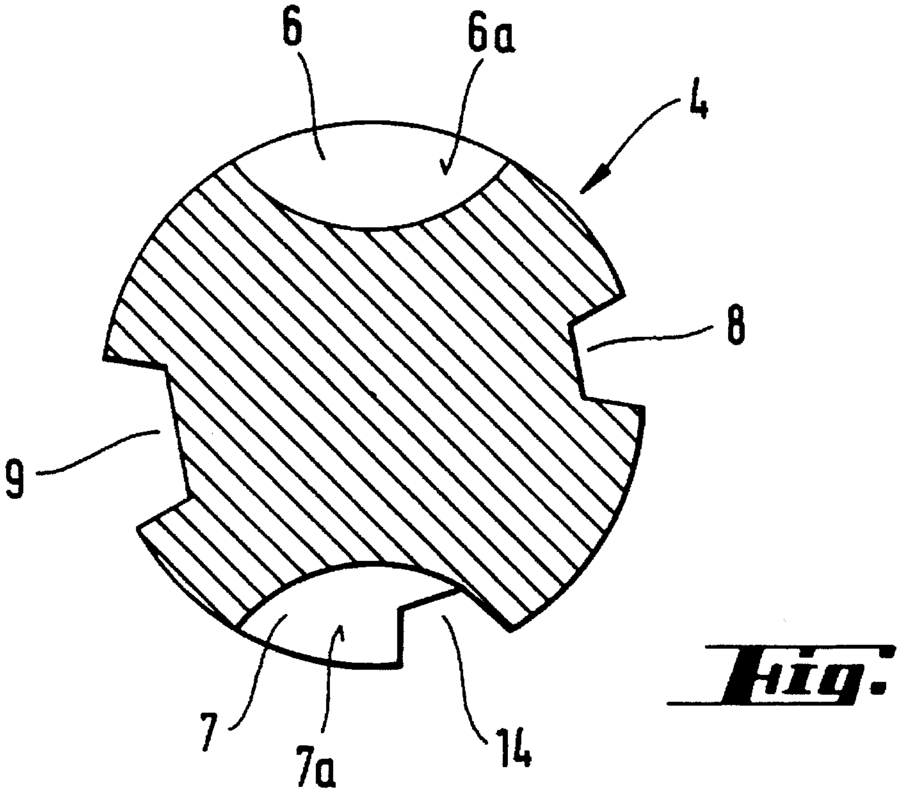
FIG. 4 is a transverse cross-sectional view of a chucking shank for a further tool bit embodying the present invention.

In FIG. 4 the chucking shank 4 of the inventive tool bit has a axially extending groove 14 open at the free end of the chucking shank and positioned asymmetrically to the locking groove 7. The angular or circumferential spacings from axes of symmetry of the rotary entrainment grooves 8, 9 relative to the axes of symmetry of the axially extending groove 14 are equal, while the axes of symmetry of the locking grooves 6, 7 and of the rotary entrainment grooves 8, 9 are not disposed perpendicularly to one another. A shoulder face *7a* is formed in the end of the locking groove 7 since the area of the axially extending groove is considerably less than that of-the locking groove 7.

Figure 5:
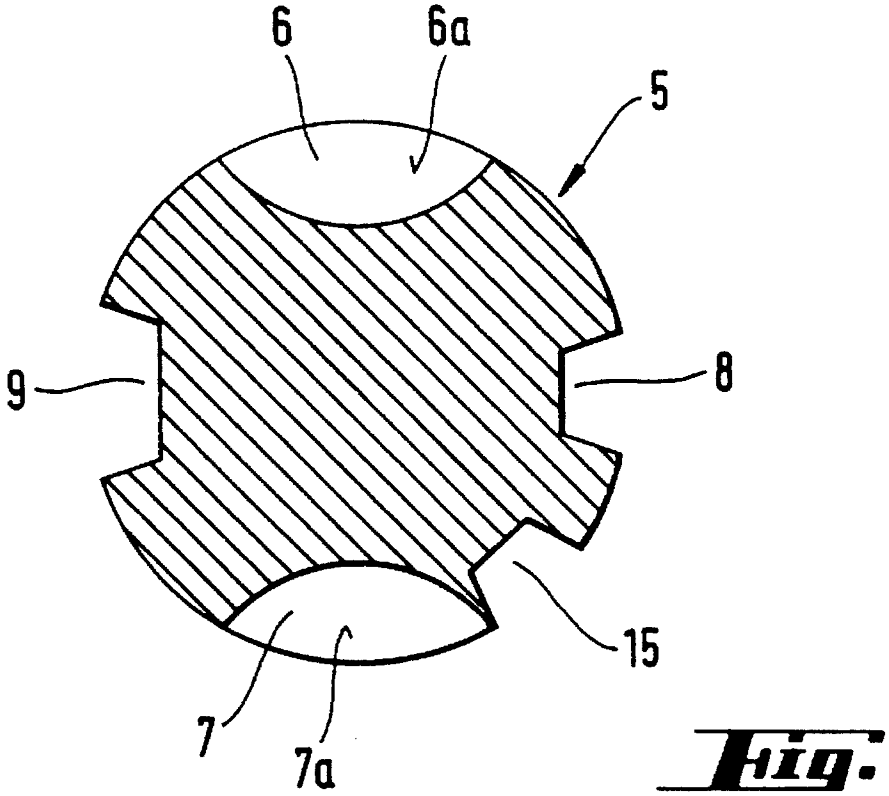
FIG. 5 is a transverse cross-sectional view of a chucking shank for yet another tool bit embodying the present invention.

In FIG. 5, the chucking shank 5 of the inventive tool bit has an axially extending groove 15 open at the free end of the chucking shank and the groove is located adjacent to and circumferentially outwardly from the cross-section of the locking groove. In this embodiment the axially extending groove 15 does not traverse the locking groove and, as a result, the shoulder face 7*a* is not reduced from its original size.

In FIGS. 2 to 4 the tool bits have the advantage that the entrainment side flanks of the axially extending grooves 11, 12, 13, 14 coincide with the axially extending side contour of the locking grooves 6, 7. As a result, there is no reduction in the flank of the axially extending grooves 11, 12, 13, 14 providing the transmission of torque. Further, the embodiment in the FIG. 5 does not involve any reduction of the flank of the axially extending groove 15 so that there is no reduction in the transmission of torque.

Figure 6:
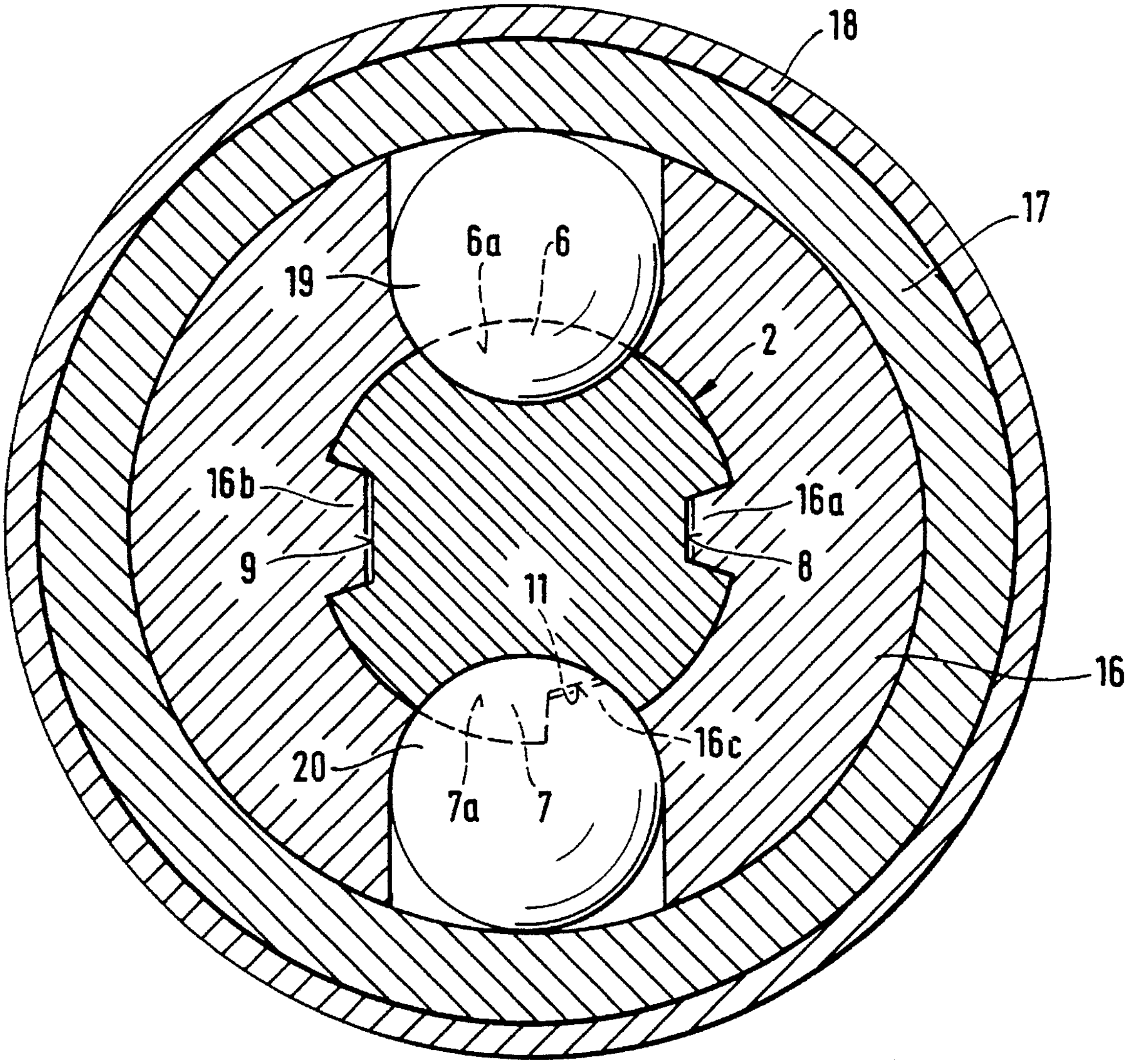
FIG. 6 is a transverse cross-sectional view of a simplified arrangement of a tool bit chuck holding the chucking shank of the tool bit shown in FIG. 2.

FIG. 6 illustrates a transverse section through a tool bit chuck, shown in a simplified manner, into which the chucking shank 2 of the tool bit in FIG. 2 has been inserted. The tool bit chuck is formed basically of an inner annular guide 16 encircled by a actuation sleeve 17 which, in turn, is laterally enclosed by a cage 18. The guide 16 has two axially extending entrainment strips 16*a*, 16*b* located diametrically opposite one another. Entrainment strip 16*b* has a larger cross-sectional area with a greater circumferential width compared to the entrainment strip 16*a*. In addition, guide 16 has an axially extending strip 16*c*.

Two locking elements 19, 20 are arranged in openings in the guide 16 so that they can be radially displaced. The locking elements are located diametrically opposite one another. Locking elements 19, 20 are shaped as balls. In addition, the axially extending strip 16*c* is located in the guide 16, as shown in FIG. 6, and the strip 16*c* is located asymmetrically to the locking element 20.

While a specific embodiment of the invention has been shown and described in detail to illustrate the inventive principles, it will be understood that the invention may be embodied otherwise without departing from said principles.

I claim:

1. Tool bit for insertion into a tool bit chuck in a manually operated tool used for cutting and/or percussion drilling comprises an axially extending chucking shank (1, 2, 3, 4, 5) with an axially and circumferentially extending outside surface and a free end, two axially extending locking grooves (6, 7) are formed in the outside surface and are located substantially diametrically opposite one another, said locking grooves (6, 7) have closed ends spaced apart in the axial direction, and two rotary entrainment grooves (8, 9) formed in the outside surface each having a different transverse cross-sectional area and an opening of different circumferential dimension in the outside surface, wherein the improvement comprises an axially extending plane extending through said rotary entrainment grooves (8, 9) subdivides said chucking shank into two axially extending halves with at least one axially extending groove (10, 11, 12, 13, 14, 15) open at the free end of said chucking shank in at least one of the axially extending halves, and said axially extending groove (15) is located adjacent to and outside the transverse cross-section of one of said locking grooves (7).

2. Tool bit for insertion into a tool bit chuck in a manually operated tool used for cutting and/or percussion drilling comprises an axially extending chucking shank (1, 2, 3, 4, 5) with an axially and circumferentially extending outside surface and a free end, two axially extending locking grooves (6, 7) are formed in the outside surface and are located substantially diametrically opposite one another, said locking grooves (6, 7) have closed ends spaced apart in the axial direction, and two rotary entrainment grooves (8, 9) formed in the outside surface each having a different transverse cross-sectional area and an opening of different circumferential dimension in the outside surface, wherein the improvement comprises an axially extending plane extending through said rotary entrainment grooves (8, 9) subdivides said chucking shank into two axially extending halves with at least one axially extending groove (10, 11, 12, 13, 14, 15) open at the free end of said chucking shank in at least one of the axially extending halves, said axially extending groove (10, 11, 12, 13, 14) is located within the transverse cross-sectional region of one of said locking grooves (6, 7) and said axially extending groove has a transverse cross-sectional area smaller than the transverse cross-sectional area of said locking groove, so that said locking grooves forms a shoulder surface (6*a*, 7*a*) at an end thereof facing away from the free end of said chucking shank (1, 2, 3, 4), and said axially extending groove (10) is arranged symmetrically relative to said locking groove (7).

3. Tool bit, for insertion into a tool bit chuck in a manually operated tool used for cutting and/or percussion drilling comprises an axially extending chucking shank (1, 2, 3, 4, 5) with an axially and circumferentially extending outside surface and a free end, two axially extending locking grooves (6, 7) are formed in the outside surface and are located substantially diametrically opposite one another, said locking grooves (6, 7) have closed ends spaced apart in the axial direction, and two rotary entrainment grooves (8, 9) formed in the outside surface each having a different transverse cross-sectional area and an opening of different circumferential dimension in the outside surface, wherein the improvement comprises an axially extending plane extending through said rotary entrainment grooves (8, 9) subdivides said chucking shank into two axially extending halves with at least one axially extending groove (10, 11, 12, 13, 14, 15) open at the free end of said chucking shank in at least one of the axially extending halves, said axially extending groove (10, 11, 12, 13, 14) is located within the transverse cross-sectional region of one of said locking grooves (6, 7) and said axially extending groove has a transverse cross-sectional area smaller than the transverse cross-sectional area of said locking groove, so that said locking grooves forms a shoulder surface (6*a*, 7*a*) at an end thereof facing away from the free end of said chucking shank (1, 2, 3, 4), said axially extending groove (14) is disposed asymmetrically to said locking groove (6, 7), said axially extending groove (14) is equidistantly spaced in the circumferential direction relative to an axis of symmetry of each of said rotary entrainment grooves (8, 9).

4. Tool bit chuck with an axially extending chuck opening for a tool bit, as set forth in one of claims 1, 2 or 3, wherein said tool bit chuck has at least one radially displaceable locking element (19, 20) cooperating with at least one of the axially closed ended locking grooves (6, 7), two axially extending entrainment strips (16*a*, 16*b*) cooperating with the rotary entrainment grooves (8, 9), said entrainment strips each has a different transverse cross-sectional area and a different width in the circumferential direction corresponding to one of said entrainment grooves (8, 9) and at least one axially extending strip (16*c*) cooperating with said axially extending groove (11).

* * * * *